United States Patent Office 3,361,969
Patented Jan. 2, 1968

3,361,969
INDEXING FIXTURE FOR TESTING THE ELECTRICAL ERROR IN ROTATING ELECTRICAL COMPONENTS
John Gordon Dixon and Artimus Alexis Ananin, Beckenham, England, assignors to Muirhead & Co. Limited, Kent, England, a company of Great Britain
Filed Oct. 11, 1963, Ser. No. 315,478
Claims priority, application Great Britain, Jan. 4, 1963, 467/63
4 Claims. (Cl. 324—158)

The present invention relates to an apparatus for the angular positioning of rotating electrical components, e.g. synchros accurately, for the purpose of electrically testing these components.

It is an object of the invention that the rotor of the rotating electrical component be positioned accurately at prescribed angular intervals.

A known manually operated synchro test fixture comprises a circular disk or plate carrying studs accurately positioned at 5° intervals throughout the 360°. The element to be tested, for example a synchro, is mounted at the centre and has a light arm fitted to its rotor shaft. The light arm is itself positioned by means of a second arm which locates by means of hardened balls on the studs on the plate and allows the rotor to be indexed at any 5° position.

It will be appreciated that apparatus of this type relies for its accuracy on the positioning of the studs, and this is limited by the mechanical operation of boring the holes for the studs.

The invention consists in an apparatus for the angular positioning of rotating electrical components comprising a rotatable disk, means for holding a rotating part of the component to rotate with the disk, studs at spaced intervals mounted in a circle around the disk, constant torque means for rotating the disk, means for arresting the rotation of the disk by engaging a stud and means for releasing the arresting means to permit the disk to rotate.

Preferably means are provided for adjusting the position of the arresting means for each stud.

Conveniently this is done by mounting the arresting means on a plate for reciprocation into and out of engagement with the studs and pivoting the plate about a fulcrum adjacent the position of contact of stud and arrestor means.

The adjustment of the position about the pivot for any particular stud is conveniently effected by screw means on another stud engaging the plate at a point which gives a long arm in relation to the fulcrum.

Preferably each stud position is adjusted by screw means on a stud in a 90° position away from the stud which is arrested.

Figure 1:
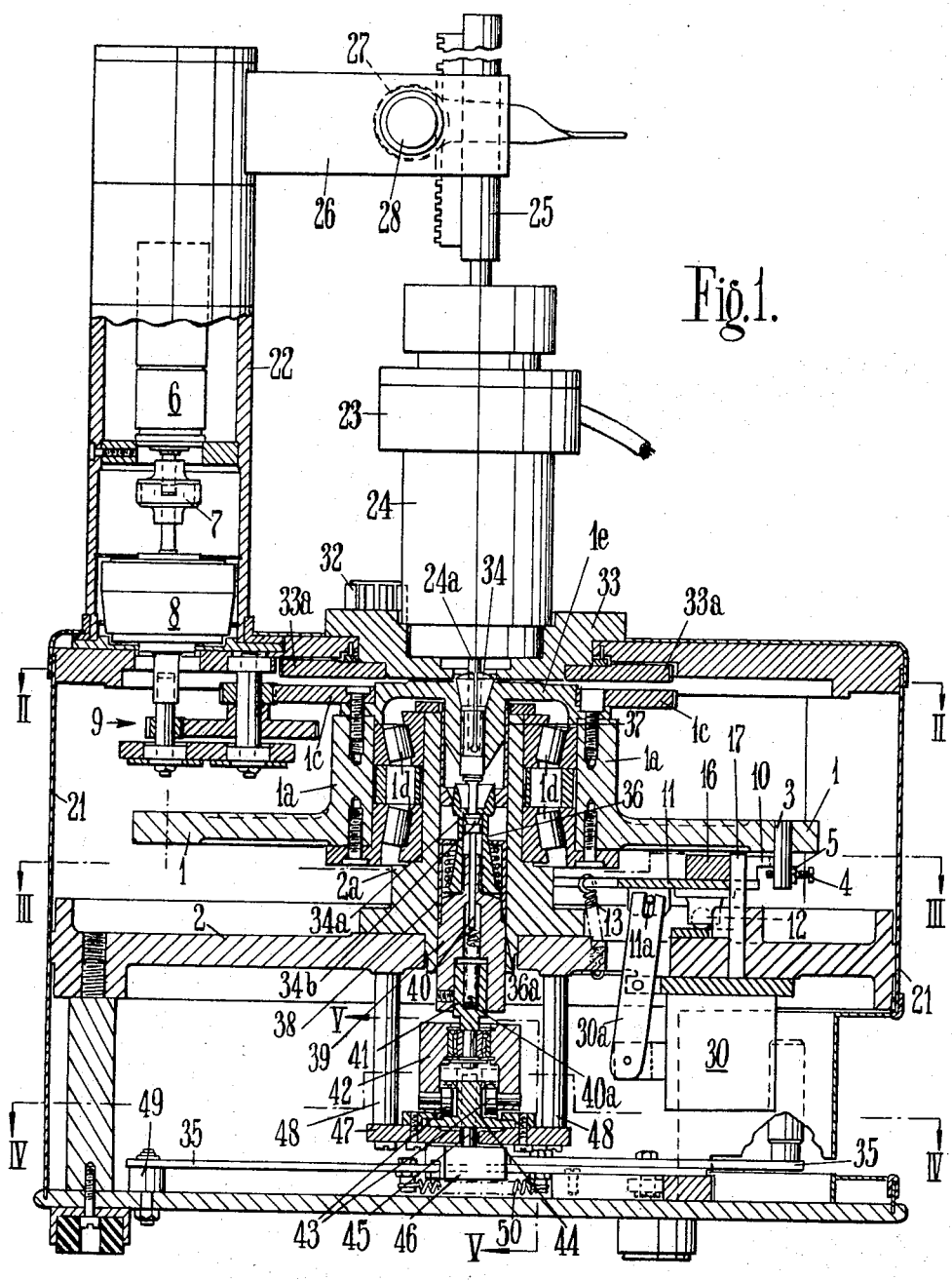
Figure 2:
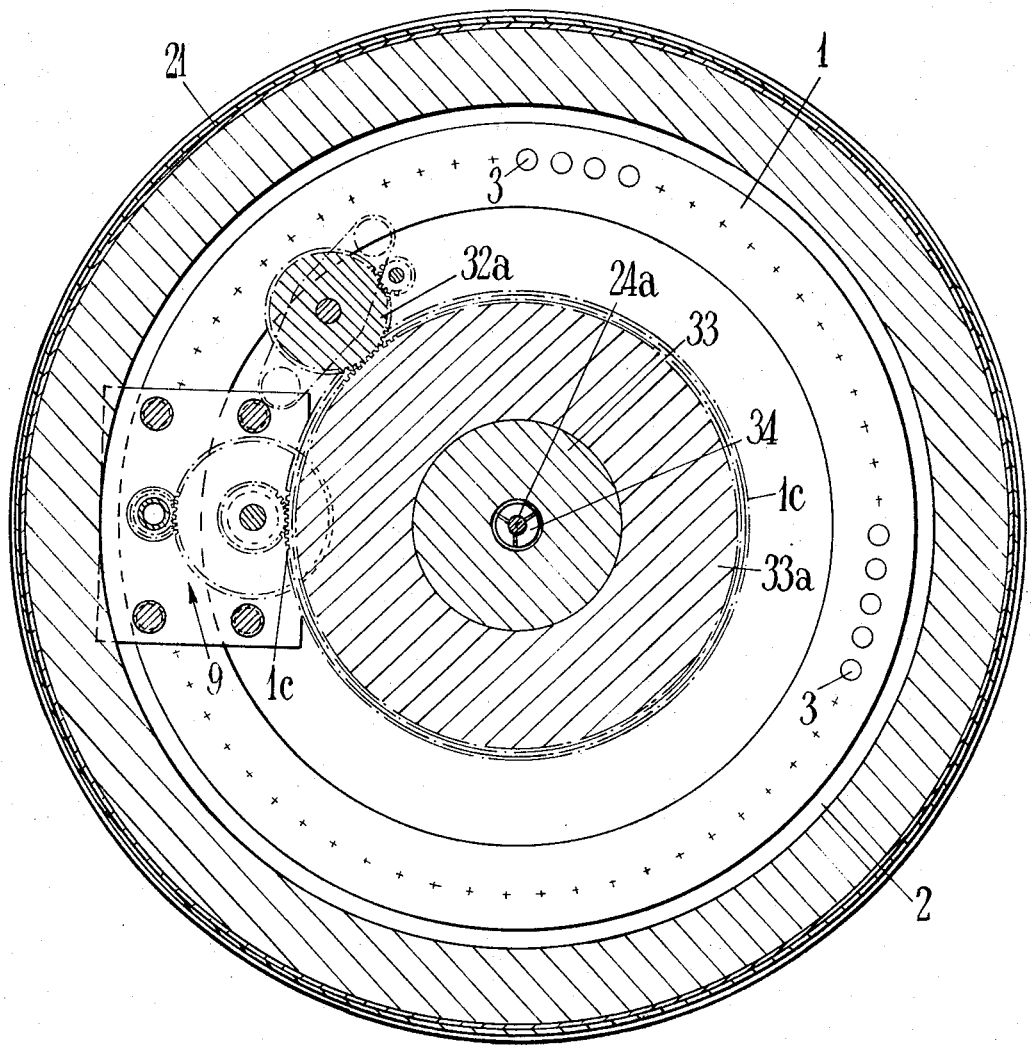
Figure 3:
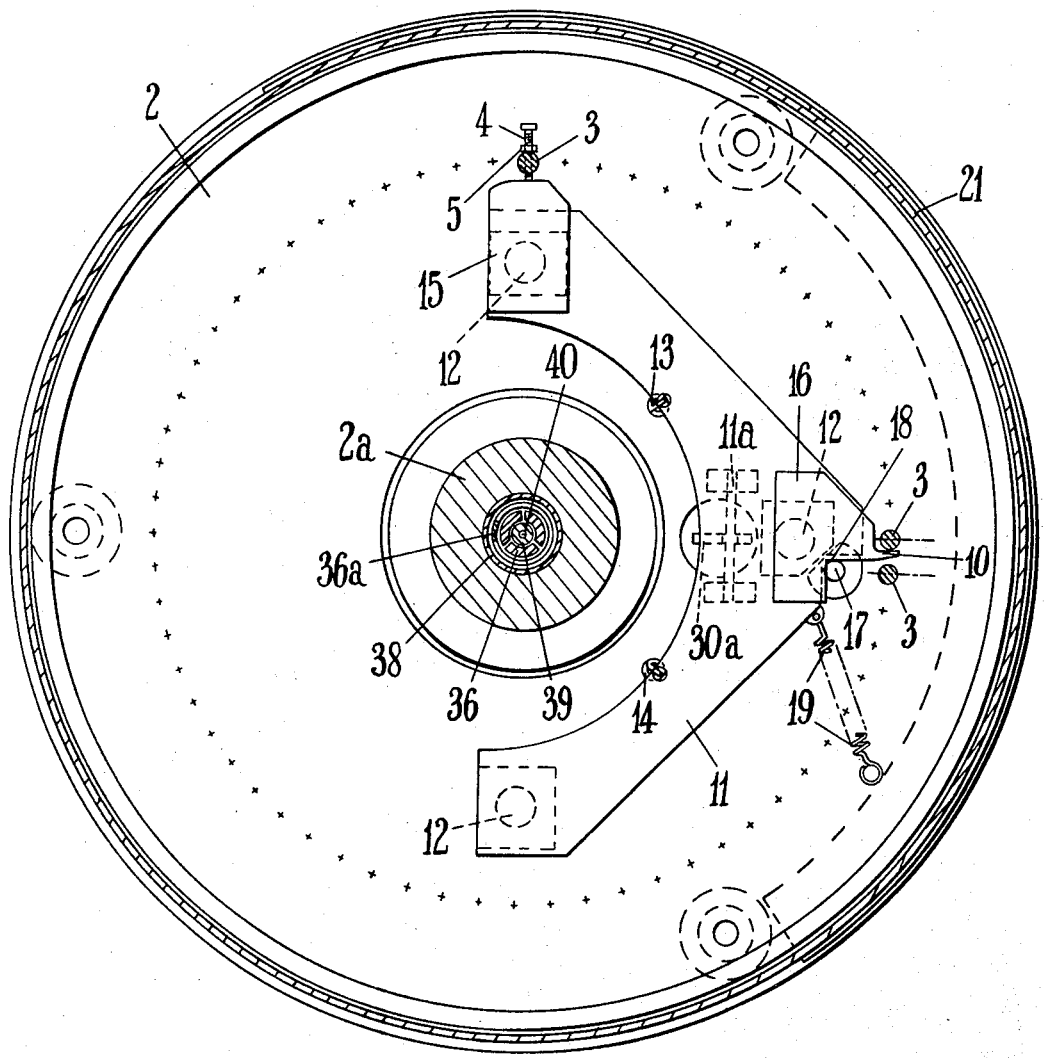
Figure 5:
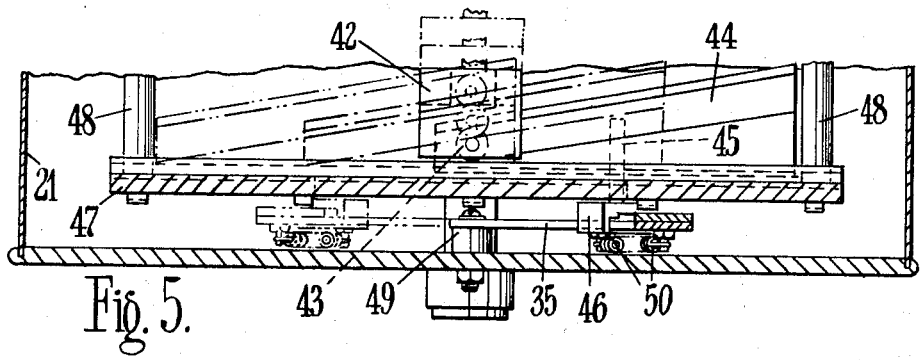
Figure 4:
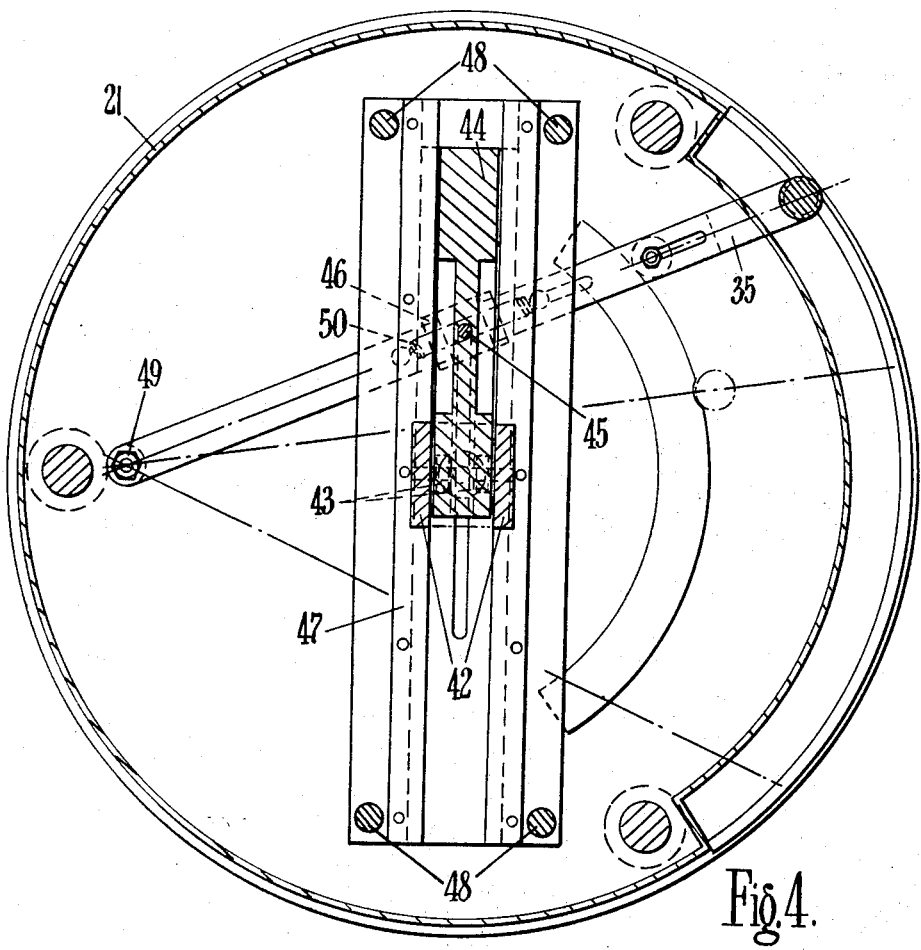

An embodiment of the invention will be described by way of example with reference to the accompanying drawings in which:

FIGURE 1 is an axial section of a complete mechanical unit;
FIGURE 2 is a section on the line II—II of FIGURE 1;
FIGURE 3 is a section on the line III—III of FIGURE 1;
FIGURE 4 is a section on the line IV—IV of FIGURE 1; and
FIGURE 5 is a section on the line V—V of FIGURE 1.

In the particular embodiment of the invention shown a circular metal disk or stud dial 1 with shaft 1a is mounted for rotation about a vertical axis in a plate 2 and has an integral gear wheel 1c secured above. Metal studs 3 are mounted on the under surface of disk 1, on a circle and positioned with reasonable mechanical precision, e.g., 15 secs. of arc, at 5° intervals. A screw 4 provided with a locking nut 5 passes radially through each of the studs 3 (only one such screw and nut is shown). The shaft of the disk is mounted in bearings 1d of the precision roller kind to eliminate all bearing shake. Disk 1 is driven continuously by electromotor 6 through a flexible coupling 7 and a slipping clutch 8 which may be of the known hysteresis kind and a speed reducing gear 9, which engages the gear wheel 1c. The rotation of disk 1 is shown as arrested by a stop arm 10.

Generally triangular plate or lever 11 is mounted beneath the disk 1 and within the circle of studs 3. Plate or lever 11 is supported at each corner on captive hardened steel balls 12 (FIGURE 3) resting on the hardened and ground surfaces on plate 2. Anchoring springs 13 and 14 extending between plate or lever 11 and plate or lever 2 exert a downward force on plate of lever 11. Two blocks 15 and 16 are mounted mutually at right angles on plate or lever 11 in positions just to the rear of the stud circle as shown in FIGURE 3. The stop arm 10 is an extension of block 16 and is shown in the drawing adjacent one of the studs 3. Pivot pin 17 mounted on plate 2 engages notch 18 in block 16 forming a fulcrum about which the plate or lever 11 is pivoted as hereinafter explained. Spring 19 extending between block 16 and the plate 2 exerts a pull on plate or lever 11 to hold it up against the pivot pin 17.

The rotating disk 1 is contained within cylindrical housing 21 and the driving mechanism comprising electromotor 6, flexible coupling 7 and hysteresis clutch 8 are mounted within a cylindrical housing 22 mounted on housing 21. A synchro 24 under test is shown in position and above this is cap 23 which is provided internally with connections for making electrical contact with the synchro terminals. Clamping rod 25 for cap 23 is mounted in bracket 26 secured to housing 22 and is adjusted by knob 27 which operates a rack mechanism and locked in its final position by knob 28.

The plate 11 has secured to the underside a bar 11a which is engaged by a fork at the end of lever 30a which is operated by a solenoid 30 mounted below plate 2, the lever 30a passing upward through a slot in the plate. Energising of the solenoid will draw the plate 11 radially inwards and release the stop arm 10 in FIGURE 3 from engagement with the upper pin 3 shown in FIGURE 3.

The fine adjustment knob 32 sets the position of the synchro stator to the true electrical zero prior to the commencement of a test by engagement of a gear wheel 32a, associated therewith, with a gear wheel 33a associated with the plate 33. The plate 33 carrying the synchro accommodates the various sizes of synchro that it is required to test.

The function of disk 1 is to rotate the rotor of the synchro under test and for this purpose a collet-type chuck 34 is mounted centrally in the disk assembly, as shown in FIGURE 1, to hold the rotor shaft 24a of the synchro. The collet-chuck 34 may be changed to accommodate different shaft diameters and for this purpose a collet clamping and release mechanism is provided operated by lever 35.

Chuck 34 slides into a recess in the part 1e of the disk 1 which in turn is centralized in an axial recess in the extensions 2a of the plate 2 supporting the bearing 1d.

The lower end of part 1e is of inverted conical shape for a purpose to be described.

The lower end of chuck 34 is formed as a rod 34a terminated by a knob 34b and penetrates within a three sector component 36.

A cylindrical insert 37 fits between the extension 1e and the extension 2a and at its lower end is formed as an inwardly projecting ring which normally has the sectors of component 36 inwardly pressed together.

Component 36 also has an inner ring which normally grips above the knob 34b to hold the collet 34 in its position gripping the spindle 24a.

Component 36 is normally held down by a spring 36a which engages under the upper rim of a cylindrical member 38 and with the upper surface of a rim around the lower end of component 36.

Below component 36 in the cylindrical recess of extension 2a is a cylindrical plug 39 through which runs a rod 40 which is spring loaded at its lower end with spring 40a and abuts against the knob 34b at its upper end.

Into a recess in the bottom of plug 39 fits a cup shaped member 41 which encloses the spring 40a and which is supported at its lower end on bearings within a block 42.

Block 42 carries inwardly projecting oppositely disposed rollers 43 which engage in slots in a wedge 44.

Wedge 44 is secured by a vertical rod 45 to a block 46 mounted centrally of the lever 35.

Wedge 44 is slidably mounted in a diametrically disposed slide 47 which is suspended from the underside of plate 2 by pillars 48.

The lever 35 is pivoted at mounting 49 and is formed in two parts, the adjacent ends fitting into slots in the block 46 and being held together by a spring 50.

The rod 45 is free to move in a slot in the slide 47.

Describing first the operation of the collet mechanism, the lever 35 has three positions shown in FIGURE 4. The upper position corresponds to the section of FIGURE 1 with a synchro spindle 24a in position and clamped by collet 34.

On rotating the lever 35 to the broken line position indicated immediately below the initial position the wedge 44 is moved in the slide 47 to the first broken line position shown in FIGURE 5.

Block 42 is raised and forces up member 41 and stresses spring 40a.

When member 41 has moved to the top of its recess on plug 39, plug 39 is raised and lifts component 36 against the action of spring 36a.

When component 36 is raised sufficiently high the sectors will no longer be inwardly restrained by the inwardly projecting ring of insert 37 and will release the knob 34b so that the spring urged rod 40 is able to push the collet 34 upwards and release the spindle 24a.

Further movement of the lever 35 to the bottom position shown by a broken line in FIGURE 4 will shift the wedge 44 into the left-hand broken line position of FIGURE 5 and will eject the collet 34. The sectors of component 36 will be spread out by the inverted conical surface on the lower end of extension 1e so as to permit this release operation.

When the collet or a new collet is inserted reversal of the operations of lever 35 will draw the collet down and clamp the spindle 24a of a further synchro to be tested.

In the setting up operation the motor 6 is started up and drives the disk to exert a constant lateral pressure on the stop arm 10 over a particular stud.

The angular position of the disk is determined optically as a reference.

A pulse is then sent to the solenoid 30 to retract the stop arm 10 against the action of spring 19 and permit the disk to rotate. The stop arm 10 is released again before the disk has rotated 5° and spring 19 draws plate 11 forward so that stop arm 10 is engaged by the next stud to arrest the disk.

When a particular stud touches stop arm 10 it exerts lateral pressure thereon tending to cause plate 11 to rotate about fulcrum 17. This tendency is resisted because block 15 is also in contact with the tip of screw 4 in the stud adjacent block 15 as shown in FIGURE 3.

The angular position of the disk is again determined by well known optical means.

If it is known that an error exists in the positioning of the stud arrested by stop arm 10, an appropriate adjustment of screw 4 in contact with block 15 will cause plate 11 to turn about fulcrum 17 causing corresponding lateral movement of stop arm 10 in a direction dependent on whether screw 4 is screwed inwards or outwards. It will be seen that the arrangement as described above effectively constitutes a lever of high mechanical advantage (in the present instance, approximately 10:1) so that a minute adjustment to the position of the stop pin may be effected by a relatively coarse adjustment of screw 4.

Thus if the angular movement is greater or less than 5° then adjustment is made of the screw 4 of the stud which is in engagement with the block 15 to correct the next angular position to exactly 5° from the first.

This operation is repeated so that all the screws 4 of the individual studs around the disk 1 (except for that corresponding to the first position) are adjusted so that an exact 5° movement occurs on each operation of the solenoid 30.

Thus the screw adjustment on each stud enables the error in the position of the stud in contact with the stop arm to be reduced to a minimum by positioning the stop arm the appropriate amount in the opposite direction. A higher degree of accuracy may thus be achieved than is normally possible.

In use the synchro is mounted and the lever 35 moved to the "clamp" position. The synchro stator is adjusted for electrical zero of the synchro by means of knob 32.

The pressing of a "start" button on an associated electrical error measuring equipment of known kind sets the apparatus in motion and without further attention the rotor of the synchro is progressively indexed through 360 degrees in 5-degree intervals at a rate determined by the associated apparatus.

By adjustment of the rate at which the studs are arrested in relation to the speeed of rotation of the disk 1 it can be arranged that each successive stud is arrested for a sufficient period for the associated electrical equipment to measure, and if required, to record the electrical error.

The apparatus as described may be used in conjunction with appropriate electrical measuring means to measure the electrical error in many types of synchro elements, e.g. control transmitters, control differential transmitters, resolvers and other forms of rotating electrical components without departing from the scope of the invention.

We claim:

1. In an apparatus for testing an electrical device of the type having a housing including a rotatable element including a shaft, said apparatus comprising a frame, a chuck rotatably mounted in said frame, means on said frame to hold the housing of the electrical device to be tested in a position such that the shaft of said electrical device is held by said chuck, an indexing device including a disc fixed for rotation coaxially with said chuck and having a plurality of equally spaced studs extending in a direction normal to said disc in a circle near the periphery of said disc, a fulcrum mounted on said frame adjacent and radially inwardly of said circle of studs, a lever element lying parallel to the plane of said disc, said lever element presenting a surface against said fulcrum generally radially of said disc so as to be movable radially with respect to said disc, a stop finger on said lever element extending radially outwardly from said lever element and adapted to be inserted between adjacent studs in said disc by radial movement of said lever element, means to reciprocate said lever element generally radially to withdraw said stop finger from between two adjacent said studs and to insert it between two other adjacent studs, an arm of said lever element extending to a point adjacent said circle of studs on said disc lying on a radius of said disc such that moving said arm of said lever element radially inwardly along said radius causes said lever element to pivot on said fulcrum to move said stop finger generally circumferentially with respect to said circle of studs, a contact surface on the end of said arm facing said circle of studs, each said stud being provided with adjustable screw means extending radially inwardly and positioned to successively engage said contact surface as said disc is intermittently turned to successively move said stop finger circumferentially to a position to stop said disc in a precise position determined by the setting of the adjustable screw means engaging said contact surface, and constant torque means biasing said disc for rotation in one direction only whereby upon activation of said means to reciprocate said lever element to withdraw said stop finger, and reinsert it to engage successive studs, said stop finger is accurately located with respect to the engaged stud by action of the adjustable screw means in the stud simultaneously engaging said contact surface on the end of said arm.

2. The apparatus of claim 1 in which said lever reciprocating means includes an electrically operated solenoid.

3. The apparatus of claim 1 in which said chuck is of the axially operated type known as a collet chuck, and manual means is provided to operate said chuck.

4. The apparatus of claim 3 in which said manual means includes a wedge movable diametrically of said apparatus, and a lever extending beyond said disc to move said wedge.

References Cited

UNITED STATES PATENTS

| | | | |
|---|---|---|---|
| 1,603,531 | 10/1926 | Flaherty. | |
| 2,726,382 | 12/1955 | Bell | 324—158 X |
| 2,804,594 | 8/1957 | Bjong | 324—158 |
| 2,807,175 | 9/1957 | Tandler | 74—815 |
| 2,829,344 | 4/1958 | Hibbitt | 324—158 |
| 3,090,633 | 5/1963 | Farnsworth | 279—5 |

RUDOLPH V. ROLINEC, *Primary Examiner.*

WALTER L. CARLSON, *Examiner.*

E. L. STOLARUN, *Assistant Examiner.*